US008070280B2

(12) United States Patent
Kato et al.

(10) Patent No.: US 8,070,280 B2
(45) Date of Patent: Dec. 6, 2011

(54) INK-JET RECORDING APPARATUS

(75) Inventors: Ryuji Kato, Aisai (JP); Noriaki Satoh, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 807 days.

(21) Appl. No.: 11/486,147

(22) Filed: Jul. 14, 2006

(65) Prior Publication Data

US 2007/0019046 A1 Jan. 25, 2007

(30) Foreign Application Priority Data

Jul. 22, 2005 (JP) ................................ 2005-213476

(51) Int. Cl.
*C09D 11/00* (2006.01)

(52) U.S. Cl. .................................... 347/100; 106/31.13

(58) Field of Classification Search .................. 347/100
See application file for complete search history.

(56) References Cited

U.S. PATENT DOCUMENTS

| | | | | |
|---|---|---|---|---|
| 5,695,820 | A * | 12/1997 | Davis et al. | 427/261 |
| 6,170,939 | B1 * | 1/2001 | Ujita et al. | 347/86 |
| 6,926,395 | B2 * | 8/2005 | Okuyama | 347/84 |
| 2002/0164178 | A1 * | 11/2002 | Muramatsu et al. | 399/258 |
| 2003/0079647 | A1 * | 5/2003 | Kaneko et al. | 106/31.43 |
| 2004/0103815 | A1 * | 6/2004 | Honma et al. | 106/31.13 |
| 2005/0116984 | A1 | 6/2005 | Tsuda et al. | |
| 2006/0019042 | A1 * | 1/2006 | Nojima et al. | 428/32.24 |
| 2006/0028519 | A1 | 2/2006 | Nakamura et al. | |

FOREIGN PATENT DOCUMENTS

| | | |
|---|---|---|
| JP | 2002019144 | 1/2002 |
| JP | 2004168795 | 6/2004 |
| JP | 2004181790 | 7/2004 |
| JP | 2005-119288 | 5/2005 |
| JP | 2005138504 | 6/2005 |
| JP | 2006-027003 | 2/2006 |

OTHER PUBLICATIONS

Federal Mogul Corporation, Material Safety Data Sheet—EPDM Rubber 'Final', Jun. 29, 2006.*

Accumetric, MSDS Document Boss 368 Butyl Rubber Sealant, Feb. 22, 2007.*

Office Action dispatched Aug. 11, 2010 in corresponding Japanese Patent Application No. 2005-213476.

* cited by examiner

*Primary Examiner* — Laura Martin
(74) *Attorney, Agent, or Firm* — Banner & Witcoff, Ltd.

(57) ABSTRACT

In an ink-jet recording apparatus, insoluble materials originating from rubber members employed in an ink passage are prevented from precipitating into a preservation solution or a water-based ink filled into the ink passage. The ink-jet recording apparatus in which the preservation solution or a water-based ink is filled into the ink passage, is configured such that a rubber member employed in the ink passage is formed of a rubber not containing a lubricant.

12 Claims, No Drawings

INK-JET RECORDING APPARATUS

BACKGROUND OF THE INVENTION

1. Field of the Invention

The present invention relates to an ink-jet recording apparatus in which insoluble materials originating from rubber members employed in an ink passage are prevented from precipitating into a preservation solution or a water-based ink filled into the ink passage.

2. Description of the Related Art

An ink-jet recording apparatus is an apparatus for performing recording by causing ink to adhere to a recording material such as recording paper by means of an ink ejection method such as a bubble method or a piezo method. In the bubble method, ink is rapidly heated to generate bubbles, and fine droplets of the ink are ejected from fine nozzles by utilizing the pressure generated by the rapid heating. In the piezo method, fine droplets of ink are ejected by use of a piezoelectric element.

In an ink-jet recording apparatus, rubber members are employed in an ink passage comprised of e.g., an ink tank and an ink-jet head. These rubber members include a cap which covers nozzles of the ink-jet head, a wiper which cleans the end face of the nozzles of the ink-jet head, a seal packing which is placed at the joint portion between components, and the like. In addition, if the ink tank is provided separately from the ink-jet head, the rubber members also include a tube which supplies ink from the ink tank to the ink-jet head, and the like.

However, when the rubber members come in contact with a preservation solution filled into an ink passage at the time of shipping or during long-term storage or with a water-based ink employed in ink-jet recording, the additives contained in the rubber members are dissolved in the preservation solution or the water-based ink. The dissolved additives then precipitate as an insoluble material, thereby causing a problem such as clogging of nozzles of an ink-jet head.

In view of the above, a method has been proposed in US-A1-20050116984. In this method, rubber materials to be employed in an ink passage are immersed in water at 60° C. for a predetermined time in a sealed container for determining the amount of dissolved materials to thereby select suitable rubber materials.

However, the amounts and kinds of the insoluble materials precipitating into a preservation solution or an ink depend on the composition of the preservation solution or the ink. Therefore, even when the rubber materials selected by means of the method of US-A1-20050116984 are employed in the rubber members forming the ink passage, the problem of the precipitation of the insoluble materials occasionally arises. Specifically, the problem may arise when the composition of the preservation solution is adjusted such that the preservation solution has a dynamic surface tension preferable for replaceability with the ink and wettability and when the composition of the ink is adjusted such that the ink has a dynamic surface tension preferable for ejection stability.

SUMMARY OF THE INVENTION

In view of such problems in conventional technology, it is an object of the invention to prevent, in an ink-jet recording apparatus, insoluble materials originating from rubber members employed in an ink passage from precipitating when any preservation solution or any ink is filled into the ink passage.

The present inventor has found a way of significantly reducing, in an ink or a preservation solution, the precipitation of insoluble materials originating from rubber members. Specifically, the precipitation can be significantly reduced by employing, for rubber members employed in an ink passage in an ink-jet recording apparatus, a rubber to which a lubricant for preventing adhesion to a mold or the like is not added.

Accordingly, the present invention provides an ink-jet recording apparatus in which a preservation solution or a water-based ink is filled into an ink passage, the ink-jet recording apparatus being characterized in that a rubber member employed in the ink passage is formed of a rubber not containing a lubricant.

In the ink-jet recording apparatus of the present invention, the rubber members employed in the ink passage are formed of a rubber not containing a lubricant. Therefore, the precipitation of insoluble materials originating from the rubber can be prevented in a preservation solution or an ink filled into the ink passage.

Particularly, even when a preservation solution is employed in which the composition is adjusted such that the preservation solution has a dynamic surface tension preferable for wettability in the ink passage and for replaceability with the ink and when an ink is employed in which the composition is adjusted such that the ink has a dynamic surface tension preferable for ejection stability, the precipitation of the insoluble materials originating from the rubber can be prevented in the preservation solution or the ink.

DETAILED DESCRIPTION OF THE PREFERRED EMBODIMENTS

The present invention will next be described in detail.

The ink-jet recording apparatus of the present invention is characterized in that rubber members employed in a part of an ink passage are formed of a rubber not containing a lubricant. The configuration of the ink-jet recording apparatus other than the above features may be the same as that of a conventional ink-jet recording apparatus. No limitation is imposed on an ink ejection method, and a thermal method, a piezo method or any other method may be employed.

In the ink-jet recording apparatus, the rubber members employed in a part of the ink passage include a cap which covers nozzles of an ink-jet head, a wiper which cleans the end face of the nozzles of the ink-jet head, and the like. In addition, if an ink tank is provided separately from the ink-jet head, the rubber members also include a tube which supplies ink from the ink tank to the ink-jet head. Further, the rubber members also include a seal packing which is an elastic member held between a buffer tank and a head unit, as disclosed in Japanese Patent Application No. 2004-207208.

In addition, the rubber not containing a lubricant refers to a rubber to which a lubricant for preventing a rubber member to adhere to a mold or the like at the time of molding is not added.

Generally, a rubber product is manufactured through various steps including kneading rubber raw materials, vulcanization molding and the like. A lubricant for preventing rubber to adhere to a mold or the like for molding is added to the rubber raw materials, and also a lubricant serving as a release agent is post-added at the time of kneading. However, in the present invention, rubber members manufactured without the addition of these lubricants are employed.

In the present invention, lubricants which are actively eliminated from the components of a rubber forming the rubber members include fatty acids. More specifically, examples of such lubricants include metal stearates, stearic acid amide, ethylene bis-stearic acid amide, monoglyceride stearate, oleic amide, erucic acid amide and the like. Of these, examples of the metal stearates include calcium stearate, zinc stearate, magnesium stearate and the like.

Moreover, examples of the rubber raw materials preferred for forming the rubber members employed in an ink passage without the addition of the lubricant include isoprene-isobutylene rubber polymer (IIR), ethylene propylene diene rubber polymer (EPDM), isoprene rubber polymer (IR), butadiene rubber polymer (BR), silicone rubber polymer (Q), chloroprene rubber polymer (CR) and the like. Of these, isoprene-isobutylene rubber polymer (IIR) is preferable in terms of water vapor penetrability, and ethylene propylene diene rubber polymer (EPDM) is preferable in terms of slidability. Commercial products may be employed as these rubber raw materials. For example, HT-1066, HT-1068 (products of JSR Corporation) or the like may be employed for isoprene-isobutylene rubber polymer (IIR). Further, EP331 (product of JSR Corporation), ESPRENE (registered trademark) 505 (product of SUMITOMO CHEMICAL CO., Ltd.) or the like may be employed for ethylene propylene diene rubber polymer (EPDM).

Further, in the kneading step for the rubber raw materials, a kneading apparatus such as a Banbury mixer, a kneader or a twin roll mill may be employed. In addition, in the vulcanization step for the rubber, heating is carried out normally at about 80° C. to about 200° C. for several minutes to several hours.

Preferably, an ink which comes in contact with the abovementioned rubber members in the ink passage in the ink-jet recording apparatus contains at least a coloring agent, water and a water-soluble organic solvent. In addition, the ink preferably has a dynamic surface tension at a lifetime of 100 ms of about 35 mN/m to about 45 mN/m as determined by a maximum bubble pressure method at a measurement temperature of 25° C.

By setting the dynamic surface tension at a lifetime of 100 ms as determined by the maximum bubble pressure method at a measurement temperature of 25° C. to about 35 mN/m to about 45 mN/m, ejection stability from an ink-jet head can be imparted to the ink. If the dynamic surface tension is less than about 35 mN/m, a desirable meniscus is not formed at a nozzle of an ink-jet head, thereby causing difficulty in ejecting the ink as fine droplets. Moreover, the wettability of the ink to a recording material such as paper becomes excessively high, causing deterioration of print quality. On the contrary, if the dynamic surface tension exceeds about 45 mN/m, difficulty arises in introducing the ink into an ink-jet head, thereby causing a problem that the ink is not ejected.

It has been known that the dynamic surface tension is generally determined by an oscillating jet method, a meniscus method, the maximum bubble pressure method or other method. However, the value of the dynamic surface tension defined in the present invention is determined by means of the maximum bubble pressure method.

In the determination of the dynamic surface tension by means of the maximum bubble pressure method, a gas is fed from a gas supply source to a probe to generate a bubble at the end of the probe which is immersed in an ink. At this time, the generation rate of the bubble is changed by changing the flow rate of the gas. The pressure on the bubble from the ink is changed along with the bubble generation rate change, and the surface tension is determined through this pressure. The pressure reaches the maximum (the maximum bubble pressure) when the radius of the bubble becomes equal to the radius of the end portion of the probe. Thus, the dynamic surface tension a of the ink at this moment is represented by the following equation:

$$\sigma=(\Delta P\cdot r)/2$$

wherein r is the radius of the end portion of the probe, and $\Delta P$ is the difference between the maximum pressure and the minimum pressure on the bubble.

The term "lifetime" shall refer to a period of time from when a bubble is separated from the probe after the pressure reaches the maximum bubble pressure to form a new surface to when the pressure again reaches the maximum bubble pressure.

The mixing composition of water and the water-soluble organic solvent contained in the ink is adjusted such that the abovementioned condition for the dynamic surface tension is satisfied. Specifically, a glycol ether is preferably employed as the water-soluble organic solvent. A glycol ether reduces the dynamic surface tension, moderately enhances the penetration rate of ink into a recording material such as paper, and improves the drying characteristics.

Specific examples of the glycol ether include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol butyl ether, tripropylene glycol methyl ether, tripropylene glycol butyl ether and the like. Of these, triethylene glycol butyl ether, dipropylene glycol propyl ether and the like are preferable since they are excellent in the capability of adjusting the dynamic surface tension and in print quality. These may be employed alone or as a mixture of two or more.

The amount of the glycol ether with respect to the total weight of the ink is preferably about 0.1 wt. % to about 10 wt. %, and more preferably about 4 wt. % to about 7 wt. %. Disadvantageously, if the amount of the glycol ether is too low, the dynamic surface tension becomes excessively high, and thus difficulty arises in introducing the ink into an ink-jet head. In addition, the penetration rate of the ink into a recording material is lowered, thereby causing problems in drying time and of bleeding. On the contrary, disadvantageously, if the amount of the glycol ether is too high, the dynamic surface tension becomes excessively low. Thus, a desirable meniscus cannot be formed at a nozzle of an ink-jet head, and swelling occurs in the rubber members. In addition, since the ink excessively penetrates into a recording material, the ink reaches the back surface of the recording material, and blurring occurs considerably.

As the water-soluble organic solvent, a humectant for preventing drying of the ink at a nozzle and for improving the solution stability of the ink may be optionally added in addition to the glycol ether. Specific examples of the humectant include, but are not limited to: polyhydric alcohols such as ethylene glycol, propylene glycol, diethylene glycol, triethylene glycol, dipropylene glycol, polyethylene glycol, polypropylene glycol, 1,3-butanediol, 1,5-pentandiol, 1,6-hexanediol, glycerin, 1,2,6-hexanetriol, 1,2,4-butanetriol, 1,2,3-butanetriol and the like; nitrogen-containing heterocyclic compounds such as N-methyl-2-pyrrolidone, N-hydroxyethyl-2-pyrrolidone, 2-pyrrolidone, 1,3-dimethylimidazolidinone, ε-caprolactam and the like; amides such as formamide, N-methylformamide, N,N-dimethylformamide and the like; amines such as ethanolamine, diethanolamine, triethanolamine, ethylamine, diethylamine, triethylamine and the like; sulfur-containing compounds such as dimethyl sulfoxide, sulfolane, thiodiethanol and the like; and the like. These may be employed alone or as a mixture of two or more.

The amount of the humectant depends on the composition of the ink and the desired characteristics of the ink and is determined over a wide range. Normally, the amount of the humectant with respect to the total weight of each ink is preferably 0 wt. % to about 40 wt. %, and more preferably 0 wt. % to about 30 wt. %. The amount exceeding about 40 wt. % is not preferable since the viscosity of the ink unnecessarily increases to potentially cause problems such as difficulty in ejecting the ink from a nozzle of an ink-jet head and significant retardation of drying on a recording material.

Further, a monohydric alcohol such as ethanol or isopropyl alcohol may be employed for the purpose of controlling the penetrability of the ink into a recording material and the drying characteristics of the ink.

In order to prevent clogging of a nozzle, an ink filter and the like caused by impurities contained in water, the water employed in the ink is not ordinary tap water but preferably high purity water such as ion-exchanged water, distilled water or ultrapure water. The amount of the water with respect to the total weight of the ink is preferably about 10 wt. % to about 98 wt. %, more preferably about 30 wt. % to about 97 wt. %, and most preferably about 40 wt. % to about 95 wt. %.

As the coloring agent, water soluble dyes typified by direct dyes, acid dyes, basic dyes, reactive dyes and the like may be employed, and various inorganic pigments and organic pigments may also be employed. In addition, a self-dispersing type pigment may be employed which is obtained by subjecting a pigment to a surface treatment.

The ink employed in the ink-jet recording apparatus of the present invention contains the coloring agent, the water and the water-soluble organic solvent as described above. In addition to the above, generally employed additives such as a dispersing agent, a viscosity modifier, a surfactant, a pH modifier and a preservative-mildewproofing agent may be added to the ink as an optional component in accordance with need. Moreover, if the ink is applied to an ink-jet method of a type utilizing the action of thermal energy to eject the ink, an additive for adjusting thermal physical properties such as specific heat, thermal expansion coefficient and thermal conductivity may be employed. Specifically, for achieving excellent print quality and for ease of introducing the ink, a polyoxyethylene alkyl ether sulfate-based surfactant represented by the following formula is preferably employed:

$$R—O-(CH_2CH_2O)_n-SO_3M$$

wherein R is an alkyl group having 12 to 15 carbon atoms, n=2 to 4, and M=Na or triethanolamine. Examples of the surfactant which is commercially available include, but are not limited to: SUNNOL (a registered trademark) NL-1430, LMT-1430 and DM-1470 (products of LION Corporation); EMAL (a registered trademark) 20C, 20CM and 20T (products of Kao Corporation); SANDET (a registered trademark) EN, ET and END (products of Sanyo Chemical Industries, Ltd.); and the like.

In a conventional ink-jet recording apparatus, the ink having a dynamic surface tension of about 35 mN/m to about 45 mN/m adjusted by use of the abovementioned components causes the precipitation of insoluble materials originating from rubber members into the ink. This results in that an ink filter is clogged and the ink is not ejected from a nozzle of an ink-jet head. However, in the ink-jet recording apparatus of the present invention, such problems are solved.

The preservation solution employed in the ink-jet recording apparatus of the present invention is prepared from the water and the water-soluble organic solvents such as the glycol ether, which are the same as those in the abovementioned ink. However, the coloring agent may be omitted. Here, preferably, the dynamic surface tension at a lifetime of 100 ms as determined by the maximum bubble pressure method at a measurement temperature of 25° C. is adjusted to about 30 mN/m to about 35 mN/m. If this dynamic surface tension is less than about 30 mN/m, the wettability of the preservation solution to the rubber members becomes excessively high, and the penetrability also becomes excessively high, thereby causing a problem of swelling of the rubber members. On the contrary, if the dynamic surface tension exceeds 35 mN/m, the preservation solution cannot be smoothly replaced with ink at the time of initial introduction of the ink into an ink-jet head.

In order for the preservation solution to have such a dynamic surface tension, the amount of the glycol ether with respect to the total weight of the preservation solution is preferably about 3 wt. % to about 10 wt. %, and more preferably about 4 wt. % to about 7 wt. %. Moreover, for ease of introducing the ink, an acetylene glycol-based surfactant represented by the following formula is preferably added:

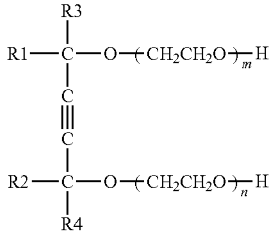

wherein m+n=0 to 50, and R1, R2, R3 and R4 are independently an alkyl group. Examples of the surfactant which is commercially available include, but are not limited to, OLFINE (a registered trademark) E1010 and E1004, SURFYNOL (a registered trademark) 104E (products of Nissin Chemical Industry Co., Ltd.) and the like.

EXAMPLES

The present invention will next be specifically described by way of examples.

(1) Preparation of Inks and Preservation Solutions

The compositions shown in Table 1 were employed for the inks and the preservation solutions, and all the components were stirred and mixed to obtain inks 1 to 4 and preservation solutions 1 to 3. In the ink compositions shown in Table 1, the actual mixing amount of each of the components is listed in weight percent (wt. %).

(2) Measurement of the Dynamic Surface Tension of the Inks and the Preservation Solutions The dynamic surface tension of each of the inks and each of the preservation solutions was measured by means of the maximum bubble pressure method at a lifetime of 20 ms to 5,000 ms and at a measurement temperature of 25° C. by use of an automatic dynamic surface tension meter (BP-D4, product of Kyowa Interface Science Co., LTD.). Then, the measurement value of the dynamic surface tension at a lifetime of 100 ms was read. The results are shown in Table 1.

(3) Evaluation of Ink Ejection Performance (Ejection Performance Evaluation)

Each of the inks was filled into a predetermined ink cartridge, and the ink cartridge was attached to a digital multi-function device equipped with an ink-jet printer (MFC-5200J, product of Brother Industries, Ltd.) in which the same ink had been filled into an ink passage in advance. A maintenance operation was then carried out for removing air bubbles generated in the ink passage, and the ratio of the number of nozzles having ejection failure to the total number of nozzles was determined at initial ejection immediately after completion of the maintenance operation. The ratio was evaluated by the following criteria. The results are shown in Table 3.

A: The ratio of the number of nozzles having ejection failure at the initial ejection is 10% or less.

B: The ratio of the number of nozzles having ejection failure at the initial ejection exceeds 10%.

(4) Preparation of Rubber Sheets

According to each of the rubber composition shown in Table 2, the components were successively fed to a rubber mixer, were kneaded, and were then discharged therefrom. The discharged mixture was extruded into a sheet-like shape by means of a biaxial extruder and then was subjected to vulcanization molding (at 170° C. for 10 minutes) to thereby obtain rubber sheets 1 to 10 for evaluation.

(5) Evaluation of Precipitation of Rubber (Precipitation Evaluation)

Each of the rubber sheets prepared in (4) was cut to dimensions of 50 mm length, 10 mm width and 2 mm thickness to form a sample for evaluation.

According to the combinations of experimental examples A-1 to A-40 and B-1 to B-30 shown in Tables 3 and 4, each of the abovementioned samples was immersed into 10 mL of the ink or the preservation solution in a sealed container and was left to stand for two weeks in a thermostatic bath at 60° C. Thereafter, the immersed sample was removed. For each case, the ink or the preservation solution after the removal of the immersed sample was filtrated with an electroformed filter (a pore size of 13 μm and an effective filtration area of 8 $cm^2$) to measure the time required for the filtration. In addition, as a control, the inks and the preservation solutions to which the sample was not added were left to stand under the same conditions as above (at 60° C. for two weeks) and were filtrated with an electroformed filter having the same specification as above to determine the time required for the filtration (the reference time). For each of the inks and each of the preservation solutions into which the sample was immersed, the ratio of the time required for the filtration to the reference time was determined and evaluated by the following criteria. The results are shown in Tables 3 and 4.

AA: the required filtration time is less than 130% of the reference time.

A: the required filtration time is at least 130% and less than 200% of the reference time.

B: the required filtration time is at least 200% and less than 400% of the reference time.

C: the required filtration time is at least 400% of the reference time.

The electroformed filters after the filtration were observed under a microscope, and it was found that the larger the ratio of the abovementioned filtration time to the reference time, the more the amount of the precipitates.

(6) Evaluation of the Weight Change of Rubber (Weight Change Evaluation)

For each of the rubber samples immersed into the ink or the preservation solution (at 60° C. for two weeks) in (5), the weight was measured before and after the immersion, and the weight change ratio was evaluated by the following criteria. The results are shown in Tables 3 and 4.

A: The weight change ratio is 0% to 5%.

B: The weight change ratio is less than 0% or exceeds 5%.

A weight change ratio of less than 0% means that the rubber is dissolved in the ink or the preservation solution. Further, a weight change ratio exceeding 5% means that the rubber is overswelled. For both the cases, ejection failure is likely to occur in actual use.

TABLE 1

(Unit: wt. %)

| | Ink 1 | Ink 2 | Ink 3 | Ink 4 | Preservation Solution 1 | Preservation Solution 2 | Preservation Solution 3 |
|---|---|---|---|---|---|---|---|
| C.I. Direct Yellow 86 | 2.5 | — | — | — | — | — | — |
| C.I. Acid Red 52 | — | — | 2.0 | — | — | — | — |
| C.I. Direct Blue 199 | — | 3.0 | — | 3.0 | — | — | — |
| Glycerin | 18.0 | 22.0 | 25.0 | 24.0 | 17.0 | 15.0 | 12.0 |
| Triethylene glycol-n-butyl ether | 7.0 | 3.0 | — | — | 5.0 | 7.0 | 11.0 |
| Dipropylene glycol-n-propyl ether | — | — | 0.8 | 0.3 | — | — | — |
| OLFINE ® E1010 *1 | — | — | — | — | 0.3 | 0.3 | 0.5 |
| SUNNOL ® NL-1430 *2 | 0.1 | 0.2 | 0.1 | 0.1 | — | — | — |
| Proxel XL-2(S) *3 | 0.2 | 0.2 | 0.2 | 0.2 | 0.2 | 0.2 | 0.2 |
| Water | Balance | Balance | Balance | Balance | Balance | Balance | Balance |
| Dynamic surface tension at a lifetime of 100 ms (mN/m) | 35.1 | 39.1 | 45.0 | 50.5 | 34.5 | 33.6 | 27.8 |

*1 Acetylene glycol-based surfactant; product of Nissin Chemical Industry Co., Ltd.

*2 Polyoxyethylene alkyl ether sulfate-based surfactant; product of LION Corporation

*3 Mildewproofing agent; product of Arch Chemicals, Inc.

TABLE 2

(Unit: parts by weight)

| | | Rubber 1 | Rubber 2 | Rubber 3 | Rubber 4 | Rubber 5 | Rubber 6 | Rubber 7 | Rubber 8 | Rubber 9 | Rubber 10 |
|---|---|---|---|---|---|---|---|---|---|---|---|
| Polymer | Ethylene propylene diene rubber polymer *1 | 100 | — | 100 | — | 100 | — | 100 | — | 100 | — |
| | Isoprene-isobutylene rubber polymer *2 | — | 100 | — | 100 | — | 100 | — | 100 | — | 100 |
| Vulcanizing agent | Dicumyl peroxide | 2.0 | | 2.0 | | 2.0 | | 2.0 | | 2.0 | |
| | Zinc white (zinc oxide) | 5.0 | 5.0 | 5.0 | 5.0 | 5.0 | 5.0 | 5.0 | 5.0 | 5.0 | 5.0 |
| Vulcanization accelerator | Tetramethylthiuram disulfide | — | 1.5 | — | 1.5 | — | 1.5 | — | 1.5 | — | 1.5 |

TABLE 2-continued (Unit: parts by weight)

| | | Rubber 1 | Rubber 2 | Rubber 3 | Rubber 4 | Rubber 5 | Rubber 6 | Rubber 7 | Rubber 8 | Rubber 9 | Rubber 10 |
|---|---|---|---|---|---|---|---|---|---|---|---|
| Lubricant | Calcium stearate | — | — | 1.0 | — | — | — | — | — | — | — |
| | Zinc stearate | — | — | — | 0.5 | — | — | — | — | — | — |
| | Magnesium stearate | — | — | — | — | 1.0 | — | — | — | — | — |
| | Stearic acid amide | — | — | — | — | — | 0.5 | — | — | — | — |
| | Ethylene bis-stearic acid amide | — | — | — | — | — | — | 1.0 | — | — | — |
| | Monoglyceride stearate | — | — | — | — | — | — | — | 1.0 | — | — |
| | Oleic amide | — | — | — | — | — | — | — | — | 1.0 | — |
| | Erucic acid amide | — | — | — | — | — | — | — | — | — | 1.0 |

*1 EP331, product of JSR Corporation
*2 HT-1066, product of JSR Corporation

TABLE 3

| Ex. No. | Rubber No. | Ink No. | Ejection performance evaluation | Precipitation evaluation | Weight change evaluation |
|---|---|---|---|---|---|
| A-1 | 1 | 1 | A | AA | A |
| A-2 | 1 | 2 | A | AA | A |
| A-3 | 1 | 3 | A | AA | A |
| A-4 | 1 | 4 | B | AA | A |
| A-5 | 2 | 1 | A | A | A |
| A-6 | 2 | 2 | A | A | A |
| A-7 | 2 | 3 | A | A | A |
| A-8 | 2 | 4 | B | A | A |
| A-9 | 3 | 1 | A | C | A |
| A-10 | 3 | 2 | A | C | A |
| A-11 | 3 | 3 | A | C | A |
| A-12 | 3 | 4 | B | C | A |
| A-13 | 4 | 1 | A | C | A |
| A-14 | 4 | 2 | A | C | A |
| A-15 | 4 | 3 | A | B | A |
| A-16 | 4 | 4 | B | B | A |
| A-17 | 5 | 1 | A | C | A |
| A-18 | 5 | 2 | A | C | A |
| A-19 | 5 | 3 | A | C | A |
| A-20 | 5 | 4 | B | C | A |
| A-21 | 6 | 1 | A | C | A |
| A-22 | 6 | 2 | A | C | A |
| A-23 | 6 | 3 | A | B | A |
| A-24 | 6 | 4 | B | B | A |
| A-25 | 7 | 1 | A | C | A |
| A-26 | 7 | 2 | A | C | A |
| A-27 | 7 | 3 | A | C | A |
| A-28 | 7 | 4 | B | C | A |
| A-29 | 8 | 1 | A | C | A |
| A-30 | 8 | 2 | A | C | A |
| A-31 | 8 | 3 | A | C | A |
| A-32 | 8 | 4 | B | C | A |
| A-33 | 9 | 1 | A | C | A |
| A-34 | 9 | 2 | A | C | A |
| A-35 | 9 | 3 | A | C | A |
| A-36 | 9 | 4 | B | C | A |
| A-37 | 10 | 1 | A | C | A |
| A-38 | 10 | 2 | A | C | A |
| A-39 | 10 | 3 | A | C | A |
| A-40 | 10 | 4 | B | C | A |

TABLE 4

| Ex. No. | Rubber No. | Preservation Solution No. | Precipitation evaluation | Weight change evaluation |
|---|---|---|---|---|
| B-1 | 1 | 1 | AA | A |
| B-2 | 1 | 2 | AA | A |
| B-3 | 1 | 3 | AA | B |
| B-4 | 2 | 1 | A | A |
| B-5 | 2 | 2 | A | A |
| B-6 | 2 | 3 | A | B |
| B-7 | 3 | 1 | C | A |
| B-8 | 3 | 2 | C | A |
| B-9 | 3 | 3 | C | B |
| B-10 | 4 | 1 | C | A |
| B-11 | 4 | 2 | C | A |
| B-12 | 4 | 3 | C | B |
| B-13 | 5 | 1 | C | A |
| B-14 | 5 | 2 | C | A |
| B-15 | 5 | 3 | C | B |
| B-16 | 6 | 1 | C | A |
| B-17 | 6 | 2 | C | A |
| B-18 | 6 | 3 | C | B |
| B-19 | 7 | 1 | C | A |
| B-20 | 7 | 2 | C | A |
| B-21 | 7 | 3 | C | B |
| B-22 | 8 | 1 | C | A |
| B-23 | 8 | 2 | C | A |
| B-24 | 8 | 3 | C | B |
| B-25 | 9 | 1 | C | A |
| B-26 | 9 | 2 | C | A |
| B-27 | 9 | 3 | C | B |
| B-28 | 10 | 1 | C | A |
| B-29 | 10 | 2 | C | A |
| B-30 | 10 | 3 | C | B |

As can be seen from the results in Tables 3 and 4, the precipitation evaluation results are poor for all the rubber samples 3 to 10 which contain the lubricant. On the other hand, the precipitation evaluation results are excellent for the rubber samples 1 and 2 which do not contain the lubricant. The rubber samples 4 and 6 contain a lesser amount of the lubricant than the other lubricant-containing rubber samples 3, 5, and 7 to 10. Therefore, the precipitation evaluation results are improved to a small extent in the inks 3 and 4 which contain a smaller amount of the glycol ether. However, the precipitation evaluation results are poor in the inks and the preservation solutions which contain a larger amount of the glycol ether.

As described above, the ink 4 improves the precipitation evaluation results to a small extent for the rubber samples 4 and 6 containing the lubricant. However, since the amount of the glycol ether is small, the dynamic surface tension exceeds 45 mN/m, and the ejection performance is poor.

Further, the preservation solution 3 contains a large amount of the glycol ether, and the dynamic surface tension is less than 30 mN/m. Therefore, since the wettability and also the penetrability become excessively high, the rubber sample swells, resulting in poor weight change evaluation results.

The present invention is useful as an inkjet recording apparatus which does not suffer performance deterioration due to precipitates with an ink or a preservation solution filled therein.

The entire disclosure of the specification, claims and summary of Japanese Patent Application No. 2005-213476 filed on Jul. 22, 2005 is hereby incorporated by reference.

What is claimed is:

1. An ink jet recording apparatus having an ink passage, in which a preservation solution is filled into the ink passage at a time of shipping or long-term storage and a water-based ink is filled into the ink passage during ink jet recording, wherein a rubber member used in the ink passage is formed of a rubber which does not comprise any of calcium stearate, zinc stearate, magnesium stearate, stearic acid amide, ethylene bisstearic acid amide, monoglyceride stearate, oleic amide, and erucic acid amide.

2. The ink-jet recording apparatus according to claim 1, wherein the rubber member is formed of isoprene-isobutylene rubber or ethylene propylene diene rubber.

3. The ink jet recording apparatus according to claim 1, wherein the ink comprises at least a coloring agent, water and a water-soluble organic solvent, and has a dynamic surface tension at a lifetime of 100 ms of about 35 mN/m to about 45 mN/m as determined by a maximum bubble pressure method at a measurement temperature of 25° C.

4. The ink jet recording apparatus according to claim 3, wherein the ink comprises a glycol ether as a water-soluble organic solvent in an amount of about 0.1 wt. % to 10 wt. % with respect to the total weight of the ink.

5. The ink jet recording apparatus according to claim 3, wherein the ink comprises a glycol ether as a water-soluble organic solvent in an amount of about 4 wt. % to 7 wt. % with respect to the total weight of the ink.

6. The ink jet recording apparatus according to claim 3, wherein the ink further comprises a polyoxyethylene alkyl ether sulfate-based surfactant.

7. The ink jet recording apparatus according to claim 1, wherein the preservation solution comprises at least water and a water-soluble organic solvent, and has a dynamic surface tension at a lifetime of 100 ms of about 30 mN/m to about 35 mN/m as determined by a maximum bubble pressure method at a measurement temperature of 25° C.

8. The ink jet recording apparatus according to claim 1, wherein the preservation solution does not comprise any coloring agent.

9. The ink jet recording apparatus according to claim 7, wherein the preservation solution comprises a glycol ether as a water-soluble organic solvent in an amount of about 3 wt. % to 10 wt. % with respect to the total weight of the preservation solution.

10. The ink jet recording apparatus according to claim 7, wherein the preservation solution comprises a glycol ether as a water-soluble organic solvent in an amount of about 4 wt. % to 7 wt. % with respect to the total weight of the preservation solution.

11. The ink jet recording apparatus according to claim 7, wherein the preservation solution further comprises an acetylene glycol-based surfactant.

12. The ink jet recording apparatus according to claim 1, wherein the rubber member used in the ink passage is formed of a rubber not comprising any fatty acids.

* * * * *